July 5, 1949.  W. W. WOOD, JR., ET AL  2,475,366
NATURAL HORIZON SIMULATING DEVICE
FOR TRAINING PURPOSES Filed March 15, 1946  4 Sheets-Sheet 1

WILLIAM W. WOOD, JR
GUNNE LOWKRANTZ
INVENTOR

BY
ATTORNEYS

July 5, 1949.   W. W. WOOD, JR., ET AL   2,475,366
NATURAL HORIZON SIMULATING DEVICE
FOR TRAINING PURPOSES Filed March 15, 1946   4 Sheets-Sheet 2

WILLIAM W. WOOD, JR.
GUNNE LOWKRANTZ
INVENTOR

ATTORNEYS

July 5, 1949.  W. W. WOOD, JR., ET AL  2,475,366
NATURAL HORIZON SIMULATING DEVICE
FOR TRAINING PURPOSES

Filed March 15, 1946  4 Sheets—Sheet 3

WILLIAM W. WOOD, JR.
GUNNE LOWKRANTZ
INVENTOR

BY
ATTORNEYS

July 5, 1949.  W. W. WOOD, JR., ET AL  2,475,366
NATURAL HORIZON SIMULATING DEVICE
FOR TRAINING PURPOSES Filed March 15, 1946  4 Sheets-Sheet 4

WILLIAM W. WOOD, JR.
GUNNE LOWKRANTZ
INVENTOR

BY
ATTORNEYS

Patented July 5, 1949

2,475,366

UNITED STATES PATENT OFFICE 2,475,366

NATURAL HORIZON SIMULATING DEVICE FOR TRAINING PURPOSES

William W. Wood, Jr., Staten Island, and Gunne Lowkrantz, Binghamton, N. Y., assignors to Link Aviation, Inc., a corporation of New York Application March 15, 1946, Serial No. 654,674

7 Claims. (Cl. 88—1)

This invention in its broadest aspects relates to leveling devices, and more particularly is concerned with a leveling device for use in leveling sighting instruments. It will be illustrated in connection with its use for leveling instruments such as sextants while taking observations upon real or simulated celestial bodies.

It is well known by those skilled in the art of celestial navigation that certain types of sextants commonly referred to as marine sextants employ a horizon viewing arrangement whereby the observer may sight the distant horizon and manipulate the index mirror of the sextant until the image of the celestial body being observed bears a predetermined relation to the image of the viewed horizon. By observing the reading of the instrument and by making the necessary conventional corrections, such as for index error, dip, etc., the altitude of the celestial body being observed may be ascertained.

Our invention relates to an artificial device which may be employed to be viewed by the user of the sextant to level the instrument, instead of employing the real horizon, whereby valuable training may be secured in the use of a marine type sextant, or similar instrument.

The apparatus to be disclosed may be installed upon the ground for use in taking practice observations upon the stars or planets, it may be used in conjunction with a single collimator arranged to represent the position of a celestial body, or it may be used in conjunction with celestial navigation trainers of the type disclosed and claimed in U. S. Patent 2,364,539 issued to Edwin A. Link. Other uses may also be found.

Essentially, the device to be described comprises a suitable light source, an image bearing member, a transparent reflector and a collimating system, all optically arranged to provide a suitable image to be viewed by the user of the sextant for leveling the instrument. The collimating system places the viewed image optically at infinity. The just mentioned apparatus is enclosed in a suitable housing which is mounted in a gimbal ring for movement about one axis, the gimbal ring in turn being mounted for movement about an axis at right angles to the first axis, in order that the device may be placed in exactly the desired position. Novel means for balancing the collimator assembly will also be disclosed, as well as many other important features of our invention.

In order that the exact nature of our device may be better understood, reference is made to the accompanying drawings, wherein.

Figures 1, 1A, 2, 3:
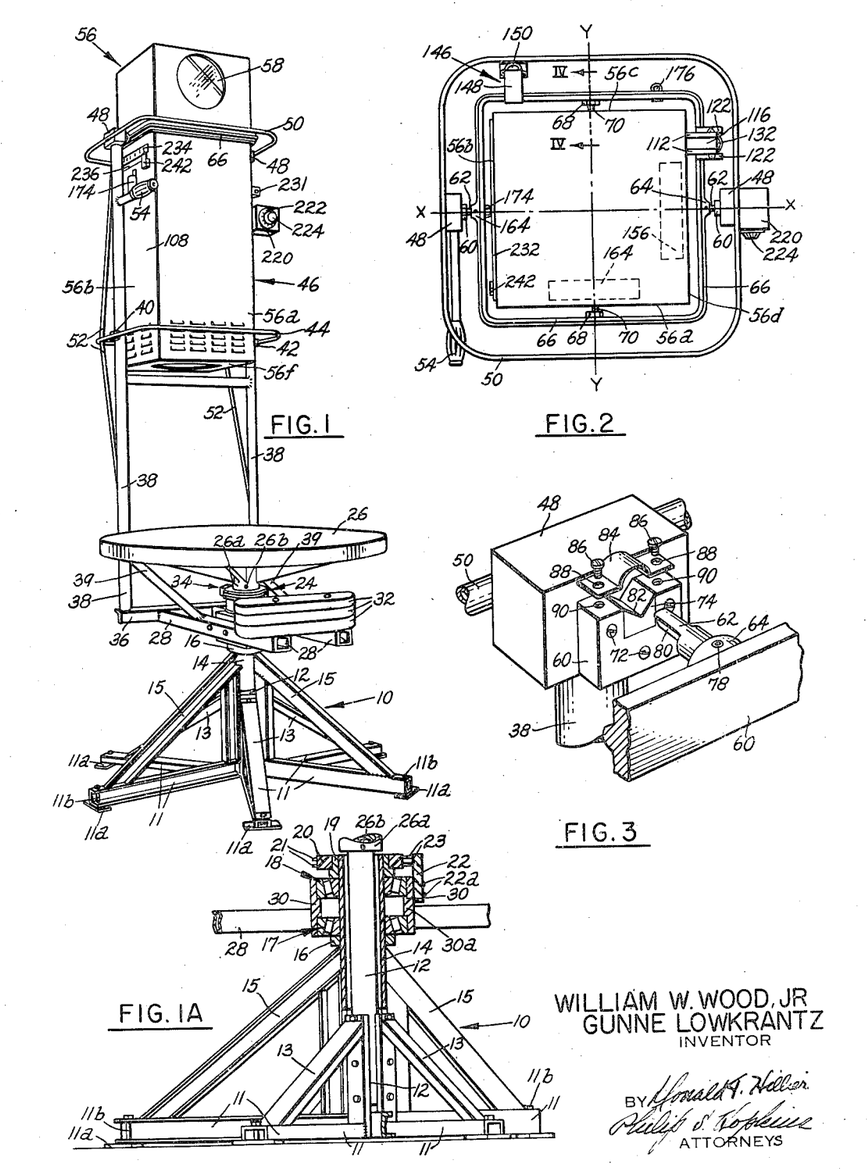
Fig. 1 is a perspective view of the exterior of the collimator assembly.
Fig. 1A is a cross sectional view of the collimator and platform mounting base.
Fig. 2 is a top view of the collimator assembly.
Fig. 3 is a perspective view of one of the bearing assemblies.

Referring now to Figs. 1 and 1A, it will be seen that a base designated generally by 10 is provided, this base including six horizontal members 11 attached to pads 11a by means of studs 11b. An inner fixed spindle 12 is provided, this spindle having mounted upon its top the platform 26 having the integral boss 26a, screw 26b holding platform 26 and boss 26a on spindle 12. Spindle 12 is rigidly held by the three angularly inclined supporting members 13 which attach to the spindle and to three of the horizontal members 11. A sleeve 14 is provided, and it should be noted that this sleeve is completely isolated from spindle 12, sleeve 14 being fixedly held by the three angularly disposed members 15, the bottom ends of which are affixed to the other three horizontal members 11. Integral with sleeve 14 is the collar 16 which supports the inner race of the bearing assembly designated generally by 17. The outer race of this assembly supports the internal ring 30a integral with housing 30, and ring 30a in turn supports the upper bearing assembly 18. The shouldered collar 19 rests upon bearing assembly 18, and supports the insulating ring 20 which carries the two slip rings 21. A brush block 22 is fixedly held by screws 22a to the housing 30, and in turn supports the two brushes 23, each of which is arranged to bear against one of the slip rings 21 for the transfer of electrical energy, as is well known. Affixed to the housing 30 are the two horizontal members 28, and a plurality of counterbalancing weights 32 rest upon one end of the horizontal members 28.

Affixed to the rear end of each of the members 28 is one of the horizontal members 36 to which in turn are affixed the upright members 38. A pair of angularly inclined members 39 are affixed to the horizontal members 28 and to the uprights 38 in order to impart additional support to the uprights.

A pair of blocks 40 and 42 are affixed to the uprights 38, and to the blocks is affixed the guard 44 which completely surrounds the lower part of the collimator assembly designated generally by 46. Upon the top of each of the uprights 38 is affixed a block 48, and each of these blocks assists in supporting the upper fixed guard 50 which also circles the collimator assembly 46. A plurality of struts 52 are affixed to the uprights 38, to the guard 44, and to the blocks 48 in order to assist in supporting the collimator assembly 46. A handle 54 is affixed to the left upright 38 in order that an observer, standing upon the platform 26, may swing the uprights 38 and the entire collimator assembly 46, as well as all other parts connected to the uprights 38, about a vertical axis through the fixed spindle 12, the bearings 17 and 18 permitting the same. The isolation of spindle 12 from sleeve 13 prevents any movements of the collimator assembly as a result of movements of the observer upon platform 26. The purpose of rotatably mounting the collimator assembly 46 in this fashion will become later apparent.

Figures 4, 6:
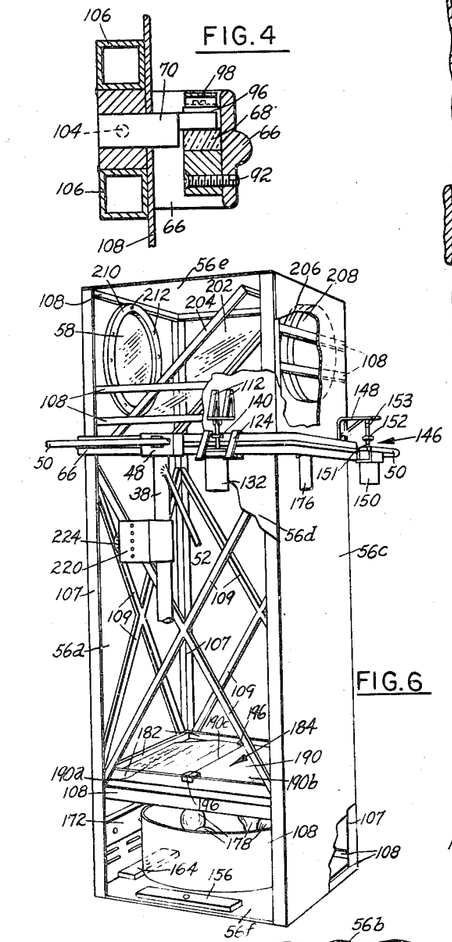
Fig. 4 is a cross sectional view of another of the bearing assemblies, taken along the line IV—IV of Fig. 2.
Fig. 6 is a perspective view of the collimator housing, certain parts being cut away for purposes of illustration.

In Fig. 1 it will be seen that the collimator assembly 46 comprises a main housing designated generally by 56. The front side of this housing is 56a, the left side 56b, the rear side 56c, the right side 56d, the top 56e and the bottom 56f, as shown in Figs. 1 and 6. A window 58 is placed in front 56a. Other detailed parts upon the outside of housing 56 are shown, and they will be later described in detail.

Reference is now made to Fig. 2 which is a top view of the collimator assembly 46 and of the elements immediately associated therewith. In Fig. 2 the blocks 48 are clearly shown and it will be seen that carried by each of these blocks is a smaller bearing block 60 each of which holds a pivot pin 62, the inner end of each of which is fixed in one of the two bosses 64 of the gimbal ring 66. The axes of the pins 62 form the transverse axis X—X, and therefore the gimbal ring 66 is free to pivot about this axis. Also carried by the gimbal ring 66 are the two bearing blocks 68 each of which pivotally holds an additional pivot pin 70, the inner ends of each of which are affixed to the collimator housing 56 in a manner to be described. The axes of the pins 70 form the longitudinal axis Y—Y, and so the collimator housing 56 is free to pivot about the axis Y—Y with respect to the gimbal ring 60. It will therefore be appreciated that by virtue of this mounting arrangement the collimator housing 46 is universally mounted and therefore may be selectively positioned about either of the two axes as the situation requires.

For purposes which will become more apparent as the description proceeds, it is important that the bearing arrangement just described shall be of the low friction type. Accordingly the following bearing arrangement may be included in my invention to very good advantage, but other low-friction type bearings may be used.

Reference is now made to Fig. 3 which is a perspective view of either of the two bearing blocks 48 and its associated elements. It will be seen that the bearing block 48 is supported by the guard 50 and by the upright 38, and that the smaller bearing block 60 is affixed to the larger block 48 by means of screws 72. The block 60 is recessed for the reception of the V-notched agate bearing 74. Integral with the gimbal ring 60 is the boss 64 which holds the pivot pin 62 by means of the set screw 78. The lower side of the outer end of pivot pin 62 is also V-shaped, but the surfaces forming the V-shaped end of pin 62 form a smaller angle than do the surfaces which form the V-notch in bearing 74. Accordingly, the lower surface 80 of pin 62 rests upon the lower surface 82 of the bearing 74, forming a knife-edge bearing having extremely low friction. A cap 84 may be attached by screws 86 passing through the holes 88 and 90, the latter being tapped, to prevent lifting of the pivot pin 62 from the agate bearing 74.

Accordingly, because of the provision of the two assemblies illustrated in Fig. 3, the location of which is shown in Fig. 2, the gimbal ring 66 may be very delicately balanced about the transverse axis X—X.

Similar assemblies like that shown in Fig. 3 are provided in order that the collimator housing 56 may also be delicately balanced about the longitudinal axis Y—Y. The exact construction of these latter bearing assemblies is illustrated in Fig. 4, both of the assemblies being identical.

Referring to Fig. 4, the gimbal ring 66 is shown as is the block 68 which is fixedly attached thereto by means of screws 92. The block 68 is recessed to hold the agate bearing 94 in the same manner as described in connection with Fig. 3. This bearing has a V-notch 96 like those previously described, and a cap 98 is provided to hold the outer end of pin 70 in position with respect to the agate bearing 94. The outer end of pin 70 also has a V shape so that the outer end of pin 70 and agate bearing 94 provide a knife-edge bearing surface, all as previously explained. The inner end of the pivot pin 70 is fixedly held by the block 102 by means of the set screw 104. Placed inside the housing 56 of the collimator assembly are two frame members 106 which extend, in a horizontal plane, completely around the interior of the four vertical walls 56a, 56b, 56c and 56d of the collimator housing 56. These frame members 106 form a part of the tubular frame work inside housing 56, the frame also comprising the four vertical corner members 107, a plurality of horizontal members 108, and a plurality of angular members 109, as seen in Fig. 6. The side walls, top and bottom of housing 56 may be attached to the frame members in any desired manner. The block 102 fits snugly between the two frame members 106 and is suitably rigidly affixed thereto by any suitable means.

It will therefore be appreciated that the two provided assemblies like the one disclosed in Fig. 4 allow easy movement of the collimator housing 56 about the longitudinal axis Y—Y, the collimator housing being delicately balanced about this axis.

Accordingly, the collimator housing 56 is delicately balanced about the axes X—X and Y—Y. Means are also provided for damping the action about both of these axes in order to prevent rapid and excessive oscillation of the collimator assembly when it is being moved by the student about the vertical axis of spindle 12, which movement, as previously explained, may be produced by means of the handle 54. The means for damping the oscillation of the collimator assembly 46 about the axis Y—Y are disclosed in Fig. 5, to which reference is now made.

Figure 5:
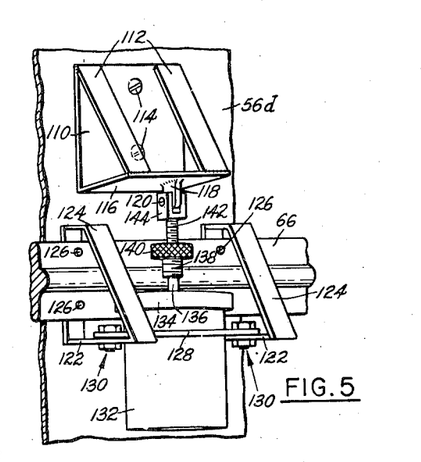
Fig. 5 is a perspective view of one of the dashpot assemblies.

In Fig. 5 it will be seen that the vertical wall 56d of the collimator housing is shown. Triangular shaped bracket 110 having two angularly disposed supporting members 112 is provided, this bracket being affixed to wall 56d by means of screws 114. Integrally formed with the bottom 116 of bracket 110 is the depending projection 118 which is transversely drilled to allow the pin 120 to pass therethrough. A pair of brackets 122 including the angularly disposed supporting members 124 are affixed to gimbal ring 66 by means of screws 126, and these two brackets support the plate 128 by means of the bolt and nut arrangements designated generally by 130. Plate 128 in turn supports the dashpot 132 having the usual cap 134 and plunger 136. The upper end of plunger 136 has formed integrally therewith the enlarged threaded portion 138 which coacts with the internally threaded knurled member 140. A threaded member 142 also enters the upper side of member 140 and the upper end of member 142 is affixed to the coupling 144 which is slotted at 146 for the reception of the depending member 118, coupling 144 also being drilled transversely for the reception of pin 120. Accordingly, coupling 144 is pivotally attached to the depending member 118 of part 116 of bracket 110. The location of dashpot 132 and of bracket members 112 and 116 is shown in Fig. 2. It will be appreciated, considering Figs. 2 and 5, that the dashpot assembly in Fig. 5 damps the oscillation of the collimator assembly 46 about the longitudinal axis Y—Y. The adjusting nut 140 of the assembly shown in Fig. 5 may be used in order to adjust the action of the dashpot assemblies, as occasion requires. Preferably, the assembly is adjusted to the near critical point.

In Fig. 6 the dashpot assembly designated generally by 146 is shown. This assembly may be substantially like the assembly show in Fig. 5, except that it has an upper bracket 148 affixed to the gimbal ring 66 instead of to the housing 56 as is the upper bracket of the assembly shown in Fig. 5. The dashpot assembly 146 also includes a dashpot 150 like the dashpot 132 in Fig. 5, dashpot 150 being held by the fixed guard 50. The plunger of dashpot 150 is numbered 151, an adjusting nut 152 is provided, and threaded link 153 interconnects nut 152 and bracket 148, exactly as shown in Fig. 5. Except for the fact that the dashpot assembly 146 is mounted with respect to the gimbal 66 and fixed guard 50, instead of with respect to the collimator housing 56 and gimbal 66, assembly 146 may be like that shown in Fig. 5. Accordingly, it will be appreciated that the dashpot assembly 146 damps the oscillation of the collimator housing 56 and gimbal 66 about the transverse axis X—X. The dashpot assembly 146 may be adjusted as required by means of nut 152.

Figure 7:
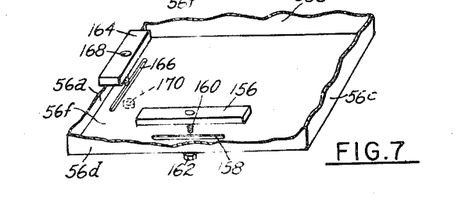
Fig. 7 is a perspective view of the adjustable weight arrangement used for balancing the collimator assembly.

Still referring to Fig. 6, the bottom 56f of the collimator assembly 46 is shown, and resting upon this bottom is the weight 156. It will be noted in Fig. 6 that weight 156 runs longitudinally of the collimator housing. Referring to Fig. 7, the bottom 56f and weight 156 are shown, and it will be seen that a slot 158 also runs longitudinally of the bottom 154. A bolt 160 passes through weight 156 and may pass through the slot 158, a nut 162 being provided for engaging the lower side of bottom 56f in order to hold the bolt 160 and weight 156 in the desired position. By virtue of this arrangement, it will be appreciated that the weight 156 may be slid longitudinally of the bottom 56f in order to adjust the entire collimator housing 56 about the transverse axis X—X.

Also seen in Fig. 6 is a second weight 164 which rests transversely upon the bottom 56f of the collimator housing, and referring to Fig. 7 it will be seen that a second slot 166 extends transversely of the bottom 56f. A bolt 168 passes through weight 164 and may pass through the slot 166, a nut 170 being provided to engage the lower threaded end of bolt 168, nut 170 being under the bottom 56f of the housing. By virtue of this arrangement it will be appreciated that the weight 164 may be positioned transversely of the bottom of the collimator housing in order to adjust the position of the housing about the longitudinal axis Y—Y.

In Fig. 6 it will be seen that a fixed weight 172 is carried by the collimator assembly in order to generally balance the assembly about the transverse axis X—X. In Figs. 1 and 2 a shot cup 174 is fixed upon the left side 56b of the collimator housing 56. This cup is provided in order that small metal pellets may be selectively placed therein in order to delicately balance the collimator assembly 46 about the longitudinal Y—Y. In Figs. 2 and 6 it will be seen that a similar cup 176 is mounted upon the rear side 56c of housing 56 in order that the collimator housing may be delicately balanced about the transverse axis X—X by the use of metal pellets put in or removed from the cup, as the case requires.

The provision of the heavy fixed weights in the bottom of housing 56 provides a pendulous structure which will accurately reposition itself about the axes X—X and Y—Y.

Figure 8:
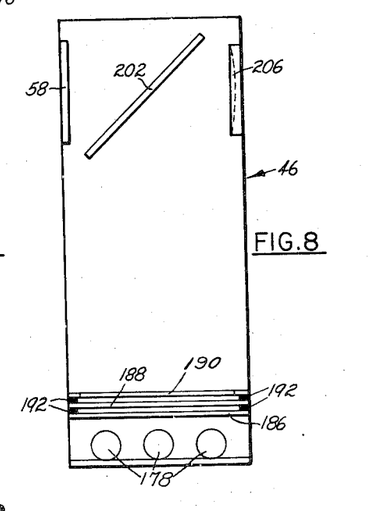
Fig. 8 is a diagrammatic view showing the relative positions of the optical members.
Figures 9, 11, 12, 13:
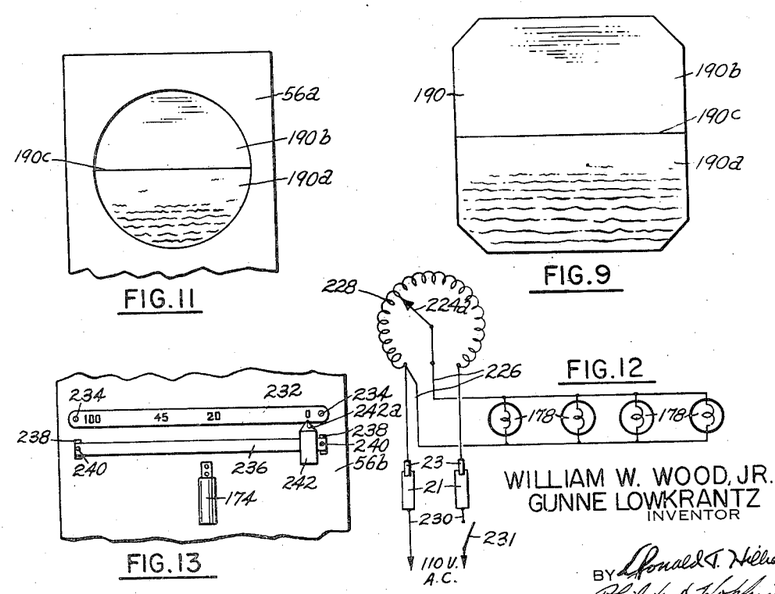
Fig. 9 is a top view of the horizon plate.
Fig. 11 shows the view seen by an observer.
Fig. 12 is a wiring diagram of the lighting system.
Fig. 13 shows the arrangement for simulating the taking of observations from different heights above the water.

Turning now to a discussion of the optical system of the invention being disclosed herein, in Fig. 6 it will be seen that four lamps 178 are suitably mounted within the lamp housing 180 which rests upon the bottom 56f of the collimator housing 56. Within the housing 56 is suitably placed a horizontally disposed plate assembly frame 182 which holds the plate assembly designated generally by 184. Referring to Fig. 8 it will be seen that the plate assembly 184 includes three plates 186, 188, and 190. The plate 186 is a blue filter plate, the plate 188 is an opal glass plate, and the plate 190 is the horizon image plate. These three glass plates are separated by suitable felt padding 192. The blue filter plate cuts down the red light emanated by the lamps 178 so that the image will be more normally colored in appearance, as will later appear. The opal glass plate diffuses the light before it reaches the lower surface of the horizon image plate. The horizon image plate is preferably a blue dye-coupled, dia-positive print of an ocean horizon photographed on an emulsion coated dry plate. The first two plates may be fixedly held by the frame member 182, but the horizon image plate 190 may be slightly smaller in size than the dimensions of the frame 182 to permit adjustment thereof in relation to the other parts of the optical system, for reasons which will become readily apparent. Plate 190 may be held in position by clamps 196. Reference is made to Fig. 9 which shows the horizon plate 190, the lower darker portion 190a of this plate having a water-like appearance, the upper lighter portion 190b having a sky-like appearance, and the two portions forming a linear horizon-like line 190c.

Positioned in the top of the collimator housing is the angularly disposed transparent reflector 202 which is held by the frame 204 which in turn is held by the framework 106 of the collimator housing. Framework 106 is shown in Fig. 4. Positioned in the rear of the housing 56 at the upper end thereof is the spherical first surface concave collimating mirror 206, held by the frame member 208 which in turn is fixedly attached to the transverse frame members 108. Upon the other side of the collimator is the viewing window 58 which has been previously mentioned, this window being held by the circular frame member 210 which in turn is held by screws 212 to the front wall of the collimator assembly.

The transparent reflecting mirror 202 is mounted at an angle of 45 degrees to the vertical axis of housing 56, and may be preferably made of optically flat planoparallel plate glass, having a transparent high reflectance coating on the lower surface and a low reflectance coating on the upper surface. By employing these coatings, one of the double images of the horizon line will be greatly diminished in intensity and the other will be increased in intensity so that no confusion will result upon the part of the observer as to which horizon image should be selected for leveling the sextant.

The window 58 has a low reflectance coating on both sides.

Any point 190c upon the horizon line 190 c may be selected, and it will be seen that diverging rays emanating from this point strike the transparent reflector 202 and are reflected toward the collimator 206. The rays will be collimated, or rendered parallel, by the mirror 206 and reflected back through the transparent reflector 202 and window 58 and will be seen at the point P. Inasmuch as all rays from the point 190c are parallel at the point P, it will be appreciated that the point 190c appears to be at infinity. Inasmuch as point 190c may be selected at random, and the horizon line 190c is composed of an infinite number of such points, the entire horizon line 190c appears to be located at an infinite distance. Similarly, the diverging rays from any point 190b which is located on any part 190b of the plate 190 which represents the sky strike the transparent reflector 202, are reflected to the collimator 206, are collimated and reflected back through the transparent reflector 202 and window 58 to the point P. Accordingly all light rays from the point 190b which pass through the point P are parallel, so that the point 190b upon the plate appears to be at infinity. Inasmuch as point 190b, in the illustrative case, was selected at random, and the sky portion 190b of plate 190 is composed of an infinite number of such points, all the sky portion 190b appears to be at infinity.

At the same time, the diverging light rays from any point 190a upon the part 190a of the plate 190 which represents the water also strike the transparent reflector 202, are reflected to the collimating mirror 206, and are there reflected back through the transparent reflector 202.

Figure 10:
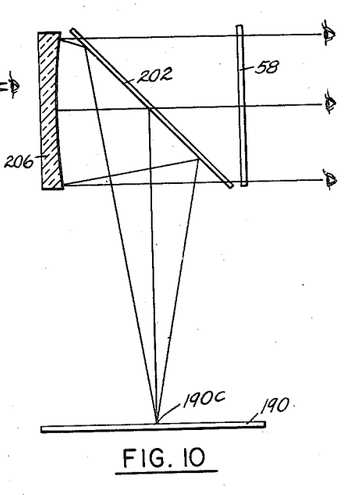
Figs. 10 and 10A show the optical principles of this invention.

Reference is now made to Figs. 10 and 11 which disclose diagrammatically the optical principles of our just described optical arrangement. The plate 190 is shown, as is the transparent reflector 202 and the collimator 206. Any point 190c, in Fig. 10, upon the horizon line may be selected, and it will be seen that diverging rays emanating from this point strike the transparent reflector 202 and are reflected toward collimator 206. The rays will be collimated, or rendered parallel, by the collimator and will be reflected back through the transparent reflector and window 58. Within the limits of the apparatus, no matter where the eye is placed all rays from the selected point upon the horizon are parallel and the point appears to be at infinity. Accordingly, all such points upon the horizon line similarly appear to be located at infinity, and so the horizon image appears to be located at infinity.

A similar optical diagram, it will be appreciated, can be prepared to illustrate that the same would be true of any point selected upon the sky portion 190b or water portion 190a.

Figure 10A:
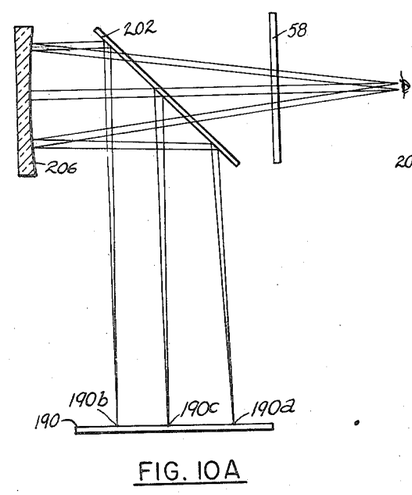

Referring to Fig. 10A, it should be particularly noted that the light rays intercepted by the eye from the portion of the plate 190b which represents the sky are not parallel with the light rays from the horizon line 190c or from the water portion 190a. The light rays from the sky portion 190b are reflected downwardly from the collimator 206, and therefore the proper illusion is obtained. The light rays from the horizon line 190c are generally parallel with true horizontal, thus preserving the proper illusion, and the light rays from the water portion 190a are inclined upwardly to produce the same effect. The same rules apply to light rays from the different parts of the sky portion 190b, different parts of the horizon line 190c, and different parts of the water portion 190a. It will therefore be appreciated that with the explained optical arrangement, not only are all light rays from any given point upon the plate 190 parallel to one another when intercepted by the eye, giving the illusion that the scene is at an infinite distance, but the proper angles are obtained between the parallel rays from each point with respect to the parallel rays of all other points so that a proper sky, horizon and water scene impression is obtained. This impression is illustrated in Fig. 11.

In view of the type of image, as shown in Fig. 11, produced by the apparatus previously explained, it will be appreciated that the apparatus of this invention may be placed out-of-doors and that practice may be secured by means of the use of a sextant equipped with a horizon viewing arrangement, in conjunction with the apparatus of this invention, in taking observations upon the stars, sun, moon and other planets. By means of the handle 54 shown in Fig. 1, the collimator assembly may be positioned so that an observation upon any selected star or planet may be taken, regardless of the azimuth of the star from the location of the apparatus. The horizon image is sighted with the sextant, just as in actual practice, and the image of the celestial body being observed is brought into coincidence with the image of the horizon line, in the conventional manner.

In order that this invention may be adaptable to various types of lighting conditions—for example day or night, cloudy, etc.—encountered during its use, the following means may be incorporated in order that the illumination of the plate 190, and consequently the intensity of the viewed image, may be regulated as desired. As seen in Fig. 1, a box 220 is fixedly mounted upon the side of the housing 56, and this box has mounted upon its face a scale 222. This scale may simply contain directions concerning the direction in which the knob 224 carried by the box must be rotated in order to increase or decrease the illumination of the plate 190. Referring now to Fig. 12, it will be seen that the lamps 178 are connected in parallel by means of conductors 226 across one of the terminals of the Variac or auto-transformer 228 and the rotor 224a of this transformer. The two fixed terminals of the transformer 228 are connected through slip rings 21, brushes 23, conductors 230 and switch 231, the location of which is seen in Fig. 1, to a suitable source of current. The rotor 224a of transformer 228 is under the control of knob 224, shown in Fig. 1. It will be appreciated therefore that the observer may, by rotating knob 224, position the rotor 224a to regulate the voltage across lamps 178, thereby regulating the intensity of the illumination of plate 190, and accordingly, the intensity of the viewed image.

In order that the apparatus of this invention may be adjusted to practice the taking of observations from different heights above the horizon, the following means are incorporated. Referring to Figs. 1 and 13, it will be seen that a scale 232 is affixed to the side 56b of the collimator housing by means of screws 234. This scale may bear suitable graduations in terms of assumed height above the water level, in the illustrated case "0," "20," "45" and "100." Below scale 232 is mounted the bar 236 which is offset from the side 56b by means of blocks 238, bolts 240 holding the bar 236 and blocks 238 in position. A slidable weight 242 having an integral pointer 242a is mounted upon the bar 236 for movement therealong. It will be appreciated that as the weight 242 is moved from the "0" end toward the "100" end, the entire horizon collimator assembly 46 will be moved about the transverse axis X—X. The angular amount of this movement will be dependent upon the distance which the weight is moved. As the weight moves toward the "100" end, it will be appreciated that the moments are changed so that the bottom end of the collimator assembly moves ahead and the upper end to the rear. Referring to Figs. 10 and 10A it will be appreciated that this movement of the collimator assembly will result in a shifting of the entire optical system so that the rays of parallel light from all the various points along the horizon line 190c passing through the point P are inclined upwardly to a greater extent to form a larger angle with the horizontal. Accordingly the reading obtained by the use of the apparatus of this invention will show the altitude of the star being observed as being greater. This exactly parallels the case when viewing the real horizon to level the sextant while taking an observation, as the distance above the real horizon increases. The observer may correct for "dip" accordingly. Movement of the weight 242 in the opposite direction would, of course, have the opposite effect, and is done whenever it is desired to simulate the taking of observations from a lower height above the water. When the pointer 242a is in the "0" position, in Fig. 10 the parallel rays from the horizon line 190c are parallel to the true horizontal.

Figures 14, 15:
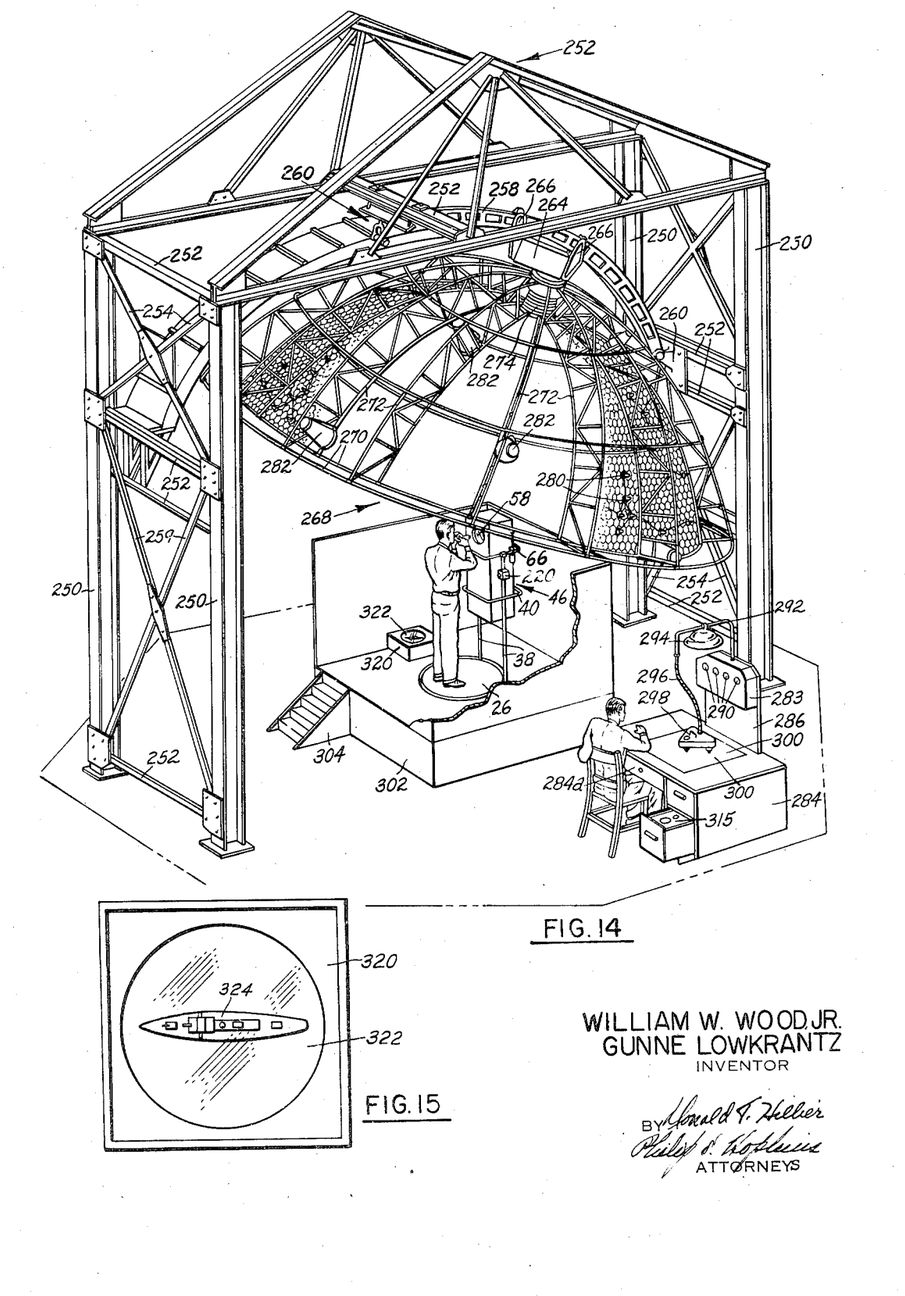
Fig. 14 illustrates the subject matter of this invention as used in conjunction with the previous mentioned celestial navigation trainers.
Fig. 15 illustrates means for indicating the assumed heading of a ship upon which an observer is assumed to be located.

As previously stated, the apparatus of this invention may also be used in conjunction with training devices of the type disclosed in U. S. Patent 2,364,539 issued to Edwin A. Link. In order to illustrate this use of the apparatus of this invention, reference is made to Fig. 14 where certain parts of the apparatus of that patent are disclosed. In Fig. 14 the main steel framework of such a trainer comprises four main upright posts 250, a plurality of transverse supporting members 252, as well as a plurality of angularly disposed supporting members 254. The upper framework is generally designated by 256, and need not be described in detail.

The conventional dome rail is designated 258, the lower end of this rail being held by the steel plate 260, and the upper end is held by the steelwork designated generally by 260. The dome gear box is numbered 264 and this gear box is supported upon the rail 258 by means of lugs 266. The dome is designated generally by 268, and includes, generally, a pair of outer hoops 270 as well as a plurality of arcuately shaped ribs 272, the lower ends of which are affixed to the hoops 270, and the upper ends of which are affixed to the main hub 274. Attached to the inside of the dome is the mesh wiring 278 upon which are mounted a plurality of light sources 280 which represent the non-navigational stars. A plurality of collimators 282 are carried by the ribs 272, these collimators representing the navigational stars upon which sextant observations are made by the student who is receiving practice in the use of the trainer. The collimators 282 may be of the type covered by U. S. Patent 2,310,031 issued February 2, 1943 to Gunne Lowkrantz.

An operator's desk 284 is provided having a panel 286 which holds an instrument panel 288. A plurality of instruments 290 are held by the instrument panel. A gooseneck 292 forms a part of the apparatus, this gooseneck holding the light 294 as well as the cable 296 which is connected to the control apparatus of the recorder or flight simulating device 298 in order to control the movements of the latter over chart 300. Device 298 is disclosed and claimed in U. S. Patent 2,179,663 issued December 5, 1944, to Edwin A. Link.

All of the preceding described apparatus shown in Fig. 14 is completely disclosed in detail in the above mentioned Patent 2,364,539, issued to Edwin A. Link, and forms no part, in and of itself, of the present invention. It is sufficient to state that the instructor positioned at the desk 284 is provided with controls in drawer 284a to move the dome gear box 264 along the dome rail 258 so that the entire dome assembly 268 is tilted with respect to the student's observation point according to the instant assumed latitude at which the student is located. Also, the entire dome assembly 268 may be rotated about an axis through the hub 274 in accordance with the instant assumed local hour angle of Aries which depends in turn upon the combined factors of instant assumed time and instant assumed longitude. Accordingly the instructor may position the entire dome assembly 268 so that the student may take observations upon any of the stars represented by the collimators 282, and if the observations are properly taken the reading obtained by the student will be the same as the reading he would secure if he were actually observing the real star represented by the collimator in question at a longitude, latitude and time corresponding to the basic assumed factors. In this manner, the student, knowing the asumed time and the star upon which it is assumed he is taking an observation, will be able to calculate his assumed latitude and longitude.

Also seen in Fig. 14 is the collimator assembly and many of its associated parts, all numbered as previously described. Around the platform 26 upon which the student stands is a larger stationary platform 302 which may be mounted by means of steps 304. The apparatus of this invention is placed, when used in conjunction with training devices of the type just described, so that the student may place his sextant in the area at which the rays from each of the collimators 282 intersect, and at the same time view the rays emanating from the collimator assembly 46 through window 58. In this manner the student may use the apparatus of this invention to level his sextant, and instead of observing the actual stars he may observe the stars represented by the collimators 282.

When so used the position of the recorder 298 may indicate with respect to chart 300 the assumed position of a water-borne vessel, and the movements of recorder 298 may be controlled by the instructor in accordance with the instant assumed factors of ship heading, ship speed, and ocean current and direction. These factors may be integrated in a manner well known to those skilled in the art of synthetic training devices, as by use of the instrument disclosed in the patent application of Gunne Lowkrantz and Karl A. Kail, Serial Number 406,056, filed August 8, 1941, for Wind drift instrument.

Such an instrument is shown in Fig. 14 and is designated 315. It has a ship speed control 316, a ship heading control 317, an ocean current speed control 318, and an ocean current direction control 319, all connected to the instrument 315 in a manner clear to those skilled in the art.

Reference is now made to Fig. 14 where the box 320 is shown mounted upon the platform 302, this box having a window 322 in the top thereof. In Fig. 15 it will be seen that contained in the box is a model ship 324 which may be rotatably mounted in any desired manner. The ship 324 represents the ship upon which the student is assumed to be located, when the arrangement shown in Fig. 14 is employed, and by reference thereto and to the dome 268 the student may ascertain in what position the collimator assembly 46 must be placed to make an observation upon the collimators 282 assumed to be off the stern, bow or abeam the ship.

If desired the ship model 324 may be rotated by the instructor at desk 284 by the well known Selsyn-type transmitting systems, such as widely used in the field of synthetic training devices, and this Selsyn transmitting system may be operated by the same control 317 used by the instructor to introduce into the wind drift instrument the factor of assumed ship heading.

As another example to illustrate the wide use of the apparatus of this invention, the apparatus shown in Fig. 1 may be mounted with respect to an artificial star in the form of a single collimator, and practice may be secured in taking observations with the use of a marine sextant.

The collimator housing 56 may be positioned by means of the adjustable weights previously described so that when the weight 242 seen in Fig. 13 is in the "0" position the horizon image will coincide with the horizontal cross-hair of a transit level when the transit level is at zero altitude.

It will be appreciated by those skilled in the art that many changes may be made in the construction of this invention without departing from the substance thereof. Also, other uses for this invention may be found by those skilled in the art. All such changes and all such uses are intended to be covered by the following claims.

We claim:

1. In a device for simulating the natural horizon the combination of a housing having a side, a frame member for holding said housing, universal mounting means interconnecting said frame member and said housing whereby said housing is mounted for movement with respect to said frame member about two mutually perpendicular axes passing through said housing above the center of gravity thereof, a source of illumination in said housing, an image carrying member in said housing arranged to be illuminated by said source of illumination, said image carrying member including a linear mark representative of the horizon, a transparent reflector in said housing, a collimating reflector on one side of said transparent reflector and a viewing window in the said side of said housing on the opposite side of said transparent reflector and extending parallel to said linear mark, said image carrying member, said transparent reflector, said collimating reflector and said viewing window all being arranged so that light rays from said linear mark are reflected by said transparent reflector to said collimating reflector which renders the rays from any point on said mark substantially parallel and reflects them through said transparent reflector and horizontally through the viewing window to form a horizontal image of said mark at approximate optical infinity.

2. In a device for simulating the natural horizon the combination of a housing having a side, a frame member for holding said housing, universal mounting means interconnecting said frame member and said housing whereby said housing is mounted for movement with respect to said frame member about two mutually perpendicular axes passing through said housing above the center of gravity thereof, movable means carried by said housing for adjusting the balance thereof about each of said axes, a source of illumination in said housing, an image carrying member in said housing arranged to be illuminated by said source of illumination, said image carrying member including a linear mark representative of the horizon, a transparent reflector in said housing, a collimating reflector on one side of said transparent reflector and a viewing window in the said side of said housing on the opposite side of said transparent reflector and extending parallel to said linear mark, said image carrying member, said transparent reflector, said collimating reflector and said viewing window all being arranged so that light rays from said linear mark are reflected by said transparent reflector to said collimating reflector which renders the rays from any point on said mark substantialy parallel and reflects them through said transparent reflector and horizontally through said viewing window to form a horizontal image of said mark at approximate optical infinity.

3. In a device for simulating the natural horizon the combination of a housing having a side, a frame member for holding said housing, universal mounting means interconnecting said frame member and said housing whereby said housing is mounted for movement with respect to said frame member about two mutualy perpendicular axes passing through said housing above the center of gravity thereof, movable means carried by said housing for adjusting the balance thereof about each of said axes, a source of illumination in said housing, an image carrying member in said housing arranged to be illuminated by said source of illumination, said image carrying member including a linear mark representative of the horizon, a transparent reflector in said housing, a collimating reflector on one side of said transparent reflector and a viewing window in the said side of said housing on the opposite side of said transparent reflector and extending parallel to said linear mark, said image carrying member, said transparent reflector, said collimating reflector and said viewing window all being arranged so that diverging light rays from any one of several selected points on said linear mark are reflected by said transparent reflector to said collimating reflector which renders the rays from any one of said points substantially parallel and reflects them through said transparent reflector and horizontally through said viewing window, the said same elements also being arranged so that the parallel rays from any one of said points are reflected by said collimating reflector converging with respect to the parallel rays from any other point to form a horizontal linear image of said linear mark at approximate optical infinity.

4. In a device for simulating the natural horizon the combination of a housing having a side, a frame member for holding said housing, universal mounting means interconnecting said frame member and said housing whereby said housing is mounted for movement with respect to said frame member about its mutually perpendicular longitudinal and transverse axes passing through said housing above the center of gravity thereof, a weight carried by said housing and movable with respect thereto to change the position of said housing about its transverse axis, indicating means carried by said housing for indicating in predetermined terms the effective displacement of said weight from a predetermined position, a source of illumination in said housing, an image carrying member in said housing arranged to be illuminated by said source of illumination, said image carrying member including a transverse linear mark representative of the horizon, a transparent reflector in said housing, a collimating reflector on one side of said transparent reflector and a viewing window in the side of said housing on the opposite side of said transparent reflector and extending parallel to said linear mark, said image carrying member, said transparent reflector, said collimating reflector and said viewing window all being arranged so that light rays from said linear mark are reflected by said transparent reflector to said collimating reflector which renders the rays from any point on said mark substantially parallel and reflects them through said transparent reflector and horizontally through the viewing window to form a horizontal image of said mark at approximate optical infinity.

5. In a device for simulating the natural horizon the combination of a fixed base, a frame member rotatably held by said base for rotation about a vertical axis, a housing having a side, universal mounting means interconnecting said frame member and said housing whereby said housing is mounted for movement with respect to said frame member about two mutually perpendicular axes passing through said housing above the center of gravity thereof, a source of illumination in said housing, an image carrying member in said housing arranged to be illuminated by said source of illumination, said image carrying member including a linear mark representative of the horizon, a transparent reflector in said housing, a collimating reflector on one side of said transparent reflector and a viewing window in the said side of said housing on the opposite side of said transparent reflector and extending parallel to said linear mark, said image carrying member, said transparent reflector, said collimating reflector and said viewing window all being arranged so that light rays from said linear mark are reflected by said transparent reflector to said collimating reflector which renders the rays from any point on said mark substantially parallel and reflects them through said transparent reflector and horizontally through the viewing window to form a horizontal image of said mark at approximate optical infinity.

6. In a device for simulating the natural horizon the combination of a fixed base, a vertical spindle supported by said base, a platform held by the top of said vertical spindle, a sleeve supported by said base surrounding said vertical spindle and separated therefrom, frame means rotatably carried by said sleeve, a housing having a side, universal mounting means interconnecting said frame member and said housing whereby said housing is mounted for movement with respect to said frame member about two mutually perpendicular axes passing through said housing above the center of gravity thereof, a source of illumination in said housing, an image carrying member in said housing arranged to be illuminated by said source of illumination, said image carrying member including a linear mark representing the horizon, a transparent reflector in said housing, a collimating reflector on one side of said transparent reflector and a viewing window in the side of said housing on the opposite side of said transparent reflector and extending parallel to said mark, said image carrying member, said transparent reflector, said collimating reflector and said viewing window all being arranged so that light rays from said linear mark are reflected by said transparent reflector to said collimating reflector which renders the rays from any point on the mark substantially parallel and reflects them through said transparent reflector and horizontally through the viewing window to form a horizontal image of said mark at approximate optical infinity.

7. In a device for simulating the natural horizon the combination of a housing having a side, a frame member for holding said housing, universal mounting means interconnecting said frame member and said housing whereby said housing is mounted for movement with respect to said frame member about two mutually perpendicular axes passing through said housing above the center of gravity thereof, movable means carried by said housing for adjusting the balance thereof about each of said axes, a source of illumination in said housing, an image carrying member in said housing arranged to be illuminated by said source of illumination, said image carrying member including a linear mark representing the horizon, a transparent reflector in said housing, a collimating reflector on one side of said transparent reflector and a viewing window in the said side of said housing on the opposite side of said transparent reflector and extending parallel to said mark, said image carrying member, said transparent reflector, said collimating reflector and said viewing window all being arranged so that light rays from said linear mark are reflected by said transparent reflector to said collimating reflector which renders the rays from any point on the mark substantially parallel and reflects them through said transparent reflector and horizontally through the viewing window to form a horizontal image of said mark at approximate optical infinity.

WILLIAM W. WOOD, Jr.
GUNNE LOWKRANTZ.

REFERENCES CITED

The following references are of record in the file of this patent:

UNITED STATES PATENTS

| Number | Name | Date |
|---|---|---|
| 1,221,902 | Pedersen | Apr. 10, 1917 |
| 1,482,244 | Morton | Jan. 29, 1924 |
| 2,053,183 | Crane et al. | Sept. 1, 1936 |
| 2,352,101 | Hutter | June 20, 1944 |
| 2,358,316 | Chwalow | Sept. 19, 1944 |
| 2,364,152 | MacGill | Dec. 5, 1944 |
| 2,385,291 | Link | Sept. 18, 1945 |

FOREIGN PATENTS

| Number | Country | Date |
|---|---|---|
| 400,182 | France | May 24, 1909 |
| 226,163 | Great Britain | May 14, 1925 |